United States Patent [19]
Landgraf

[11] 3,969,170
[45] July 13, 1976

[54] METHOD FOR MAKING A THERMOPLASTIC SLEEVE TO BE USED AS COUPLER FITTING FOR TUBES

[75] Inventor: Helmut Landgraf, Rumeln-Kaldenhausen, Germany

[73] Assignee: Mannesmann Aktiengesellschaft, Dusseldorf, Germany

[22] Filed: Oct. 22, 1971

[21] Appl. No.: 191,875

[52] U.S. Cl................................. 156/158; 156/162; 156/190; 156/195; 156/229; 156/244; 156/275; 156/294; 156/296; 219/62; 285/21
[51] Int. Cl.²..................... F16L 13/02; F16L 47/02
[58] Field of Search............. 156/187, 188, 190–192, 156/195, 215, 230, 244, 249, 275, 298, 49, 53, 143, 229, 158, 162, 294, 296; 285/417, 21; 219/62, 547

[56] References Cited
UNITED STATES PATENTS

| | | | |
|---|---|---|---|
| 2,930,634 | 3/1960 | Merritt | 156/275 |
| 2,960,425 | 11/1960 | Sherman | 156/187 X |
| 3,061,503 | 10/1962 | Gould et al. | 285/21 |
| 3,062,940 | 11/1962 | Bauer et al. | 285/417 |
| 3,094,452 | 6/1963 | Von Riegen et al. | 285/21 |
| 3,094,452 | 6/1963 | Von Riegen et al. | 156/275 |
| 3,107,697 | 10/1963 | Daggett et al. | 156/143 |
| 3,219,738 | 11/1965 | Olson | 156/143 |
| 3,235,289 | 2/1966 | Jones | 156/190 X |
| 3,271,064 | 9/1966 | Hall | 156/143 |
| 3,378,672 | 4/1968 | Blumenkranz | 156/275 X |
| 3,422,179 | 1/1969 | Bauer et al. | 285/21 |
| 3,477,891 | 11/1969 | Hawerkamp | 156/143 |
| 3,506,519 | 4/1970 | Blumenkrantz | 156/275 |
| 3,607,501 | 9/1971 | Okumura | 156/143 |
| 3,616,006 | 10/1971 | Landgraf et al. | 156/188 |
| 3,629,037 | 12/1971 | Masuda et al. | 156/244 |
| 3,671,348 | 6/1972 | Kemsey-Bourne | 156/187 |
| 3,788,928 | 1/1974 | Wise | 156/294 |

*Primary Examiner*—William A. Powell
*Assistant Examiner*—Basil J. Lewris
*Attorney, Agent, or Firm*—Ralf H. Siegemund

[57] ABSTRACT

A thermoplastic coupler sleeve for interconnecting tubes or pipes is made by extruding thermoplastic material, e.g., polyethylene, to make a ribbon, and wrapping the ribbon around a heater coil in as many layers as needed to obtain the sleeve.

16 Claims, 5 Drawing Figures

METHOD FOR MAKING A THERMOPLASTIC SLEEVE TO BE USED AS COUPLER FITTING FOR TUBES

The present invention relates to method for making a coupling sleeve for unreleasably interconnecting the ends of thermoplastic tubes. Particularly, the sleeve is to interconnect tubes of large diameter and has an electrical heating conductor embedded in (or close to) its inner wall, to develop welding heat after the sleeve has received the ends of the tubes to be interconnected.

Welding sleeves of that type are used for interconnecting thermoplastic tubes (or hose, or pipes) after installation. Upon using such sleeves as coupler fittings the interconnection may be carried out by unskilled laborers and still positive and firm connection is guaranteed. The tubes to be interconnected are inserted into the sleeve, and then welding current is applied to the heating conductor. Sleeve and tube-ends are heated and particularly the mutually engaging (telescoped) surface portions are softened. The material even melts and fuses. Upon cooling (turning off the welding current) the sleeve is indeed welded to the two tube ends interconnecting both of them.

Such coupler sleeves are usuallly made by injection molding, which is not too simple technically and is also not too economical. In particular, the heating conductor has to be positioned within the mold so that the injected plastic flows around the conductor to obtain the desired embedding. The coiled conductor resists somewhat the contraction of the sleeve upon cooling. As a consequence, peripheral tension is set up in the plastic, unless suppressed by relaxation. Upon heating by the welding current, the tendency to contract causes the plastic to penetrate the spacing between the conductor windings. That contraction is actually beneficial as the diameter reduction of the sleeve permits compennsation of differences in diameter of sleeve and tubes. compensation the tension may act as source for welding pressure.

It was found that the various phenomena can be controlled quite well for small diameter tubes and sleeves, but the same is not true for tubes and sleeves of large diameter. It is an object of the present invention to make sleeves for use as couplers of large diameter tubes, permitting the generation of considerably large circumferential tension than resulting from injection molding, so that compensation of considerable differences in diameter and large welding pressure is provided for.

Pipes and tubes interconnected by sleeves that have been electrically welded to the pipes and tubes may fail in case of considerable stress. As the bond fails, a crack forms transversely to the axis of the tube. This crack is due to notch effect provided by the conductor wire, even if stress is solely the result of high internal pressure. Thus, the crack is not formed in direction of maximum stress. However, it is known that time dependency of creep strength and the sensitivity to notch effect is substantially lower for the type of polyethylene that is used for injection molding than is the case for higher molecular polyethylene as used for extrusion.

In order to avoid the above-mentioned difficulties and in order to achieve the object of the present invention, it is suggested to use an extrudable thermoplastic for making such a coupler sleeve. In particular, a ribbon is extruded from a wide slot type (fishtail) nozzle and wrapped around a heating conductor coil, which is positioned on a rotating mandrel. Plastic ribbon is wrapped in that manner until the desired sleeve thickness is obtained whereupon the ribbon is cut. The axial front ends of the sleeve may be edged or otherwise finished and withdraw from the mandrel.

It was found desirable to stretch the thermoplastic ribbon, e.g., by adjusting the exit speed from the extruder below the winding speed as determined by the rotational speed of the mandrel. In case a single sleeve is made in one wrapping step, the ribbon should have width (as determined by the width of the extruder nozzle) so that upon stretching its width is still somewhat larger than the width (axial length) of the mandrel or of the heating coil thereon. The mandrel just rotates, there is no axial precession:

Plural sleeves can be made concurrently in the following manner. Plural heating conductor coils are placed onto the mandrel or onto plural, axially coupled mandrels, and the ribbon is helically wrapped onto the mandrel. The width thickness and relative axial advance or precession of the ribbon (helical pitch) are parameters for determining the wall thickness of the resulting sleeves.

The ribbon does not have to be uniformly thick. Rather, the central portion may be thicker than near the ends. That, in turn, is instrumental in obtaining a particular axial distribution of the wall thickness of the sleeve. A nonuniform wall thickness can also be obtained by changing the degree of stretching, e.g., the speed relation of mandrel rotation and extruder speed is varied as desired. In case the ribbon is stretched more, its width is actually reduced. It should be mentioned here that the tension in the sleeve is reduced by increasing wall thickness of the sleeve. This is necessary particularly in the areas that are endangered. Control to that extent is much more economically obtainable in the method of the invention than in case of injection molding. This is particularly so, the larger (heavier) are the sleeves to be made.

Creep strength, particularly time dependency thereof, can be improved as a result of the particular method by including reenforcing and strengthening elements and wrapping them into the sleeve as it is being made. It should be noted here that such reenforcing elements must not impede the radial contraction of the sleeve during heating and welding. Thus, the strengthening elements must be load bearing in axial direction, but in the plurality they must be yielding radially and circumferentially. This is obtained by using rods that extend in axial direction, and they are wrapped into the sleeve accordingly. The rods are to have a larger modulus of elasticity and smaller thermal expansion than the thermoplastic of the ribbon. By way of example, rods of glass fiber reenforced epoxy resin may be used. These rods are preferably wetted by application of liquid resin prior to insertion and wrapping. In order to facilitate insertion, the rods may be prepared to form the "steps" of a rope ladder, and that "ladder" is then wrapped into the sleeve as it is being wrapped itself. The rods may have profile section to facilitate positioning.

Some thermoplastics age and become very difficult to weld. In case long storage times are to be expected for such a sleeve before being used, a type of plural layer wrapping can be chosen wherein inner layers as juxtaposed to the heating coil are wrapped with ribbon of a highly stabilized material. Also, these inner parts of the sleeve could be made by using as wrapping material a plastic that is particularly suitable for thermoplastic welding or as to notch impact strength. Another ribbon material is used for wrapping the outer layer having characteristics of low relaxability and of high molecular internal constuction. In case of low pressure, polyethylene varieties having molecular weight of 90,000 and above are quite suitable here.

This dual layer construction of a sleeve can be obtained by sequentially using ribbons of the two different materials for wrapping onto the mandrel. The two ribbons are, of course, extruded from different extruders. However, a single fishtail die type nozzle can be used, fed by two different extruding machines at different times.

It is known per se to clad a heating conductor in a plastic jacket, using the same or a similar type plastic as used later on for making the embedding sleeve. The jacket has about half the thickness of the heating wire. The same technique is also applicable here.

The pitch of the heating coil on the mandrel (axial loop spacing) is to be about two to five times the diameter of the conductor, preferably about three times the diameter. This pitch of the helix can be obtained by winding another wire onto the mandrel, as a kind of heating coil loop spacer. For this a material should be chosen that will not weld to the thermoplastic of the ribbon as later on wrapped onto the heater coil. Upon completion of the sleeve, the spacer wire is removed.

In the preferred form of practicing the invention, a mandrel is to be used that has particular provisions for holding a heating conductor. This holder includes steel strip wrapped around the mandrel ends and being removable therefrom. The steel strip ends are angled and inserted in a longitudinal groove or slot in the mandrel, so that they can be slipped off axially. The steel strip has on its outside a boss or protrusion. A heating conductor end is formed into a loop or eye and slipped onto such a boss for holding the conductor during ribbon wrapping.

The mandrel is preferably biparted and can be disassembled accordingly. One half has a projecting nose received in a mating indentation of the other half. That projecting nose serves also to receive a stop ring for the pipes. The stop ring is likewise to be included in the wrapped sleeve.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
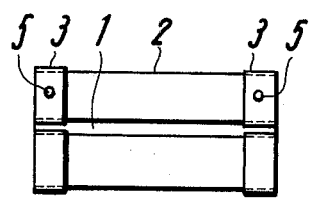
FIG. 1 illustrates side elevation of a normal mandrel to be used for sleeve wrapping in accordance with the preferred embodiment of the present invention.
Figure 2:
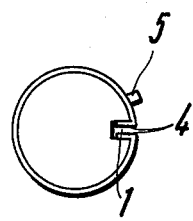
FIG. 2 is a front view of the mandrel shown in FIG. 1.

Proceeding now to the detailed description of the drawings, in FIG. 1 thereof is shown a mandrel 2 having, e.g., 200 mm diameter and axial length of 150 mm. The mandrel has a longitudinal slot or groove 1. Angled off ends 4 of steel strips 3 are inserted in slot 1 to hold the wrapped around strips respectively near the two ends of the mandrel. The mandrel has been heated. Each strip 3 has boss 6 of about 6 mm diameter to hold an eye formed at one end of a heating conductor coil; or course, both ends of the heating conductor are held in that manner by the two bosses 5. The mandrel may be made of two parts that are coaxially positioned and can be turned relative to each other with additional provision of position locking to inhibit relative turning during wrapping operation.

Figure 3A:
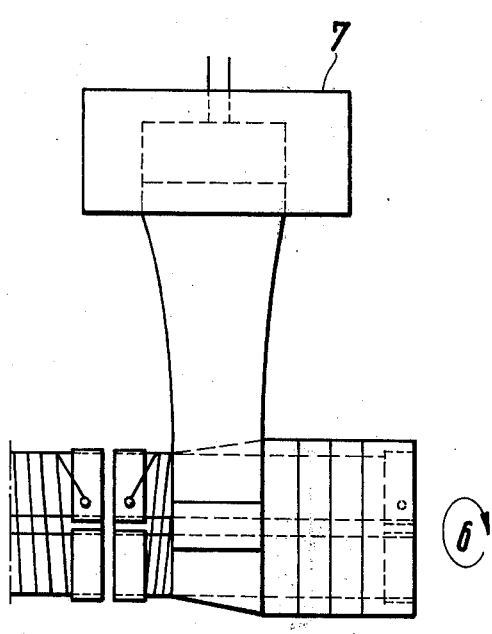
FIGS. 3a and 3b illustrate front and side views of extruding and wrapping equipment for practicing the method in accordance with the preferred embodiment of the invention.
Figure 3B:
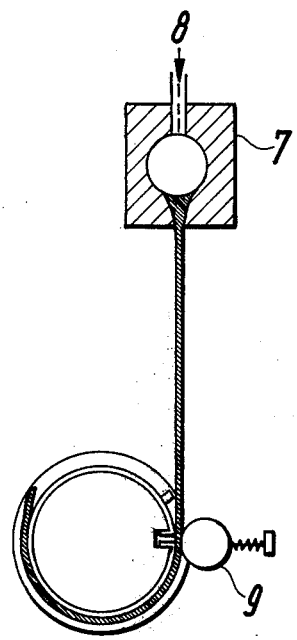

By means of a wire winding machine a heating coil is wound onto the mandrel, whereby the machine takes care of obtaining a particular pitch of the resulting helix. There may be plural such mandrels, all carrying a heating coil, and they are axially coupled together, for example, by means of bolting, so that ribbon can be wound onto all of them with axial precession. As shown in FIG. 3, there is spacing in-between the loops of the helical heating coil.

The plural mandrel configuration, thus, prepared may be placed onto an axially movable carriage (schematically shown at 6), disposed underneath a fishtail nozzle 7 of an extruder. The broad slot of that nozzle has width of about 350 mm and height of 1 mm. An extruder feeds plastic material (polyethylene) to the nozzle as is known per se for the nozzle to extrude a plastic ribbon. As can be seen from FIG. 3, the ribbon is wider than the spacing between the loops of the coil helix. The material is preferably low pressure polyethylene with a molecular weight of about 100,000.

The mandrel rotates at a circumferential speed about twice the withdrawal speed of the ribbon from the extruder. That ribbon is, thus, stretched, and with the aid of pressure roller 9 it is wrapped onto and around the mandrel that bears the heating coil. Wrapping continues until there are as many layers as needed for the particular polyethylene sleeve, i.e., it may vary from case to case. Plural, axially interconnected mandrels move relatively slowly axially so that there is a tubular, somewhat helical wrapping and subsequently individual sleeves are cut. A single mandrel will be wrapped in ribbon without such axial precession.

Plural mandrels may be provided on a carrousel-like holder, so that the ribbon wrapping operation (and extrusion) can be carried out uninterruptedly while a mandrel with completed wrapping is replaced by an empty one.

After completion of wrapping the axial ends are finished, e.g., edged; the sleeve so made is cooled and removed from the respective mandrel. The steel strips 3 have remained in the sleeve as the heating coil is tied to the bosses; now they are removed. The loops or eyes now freed can serve later on for connection to the voltage source that will power the conductor for heating and welding. It may be necessary to provide the sleeve with radial bores for access to these eyes inside of the sleeve.

It was found that the contraction of the sleeve upon welding is so large that the gap between inner sleeve diameter and outer diameter of inserted tube ends can be twice as large as in case of injection molded sleeves. The time dependency of creep strength is also considerably improved.

Figure 5:
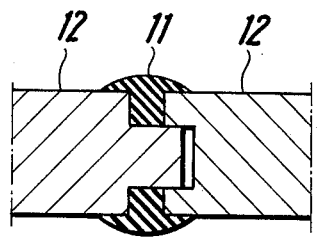
FIG. 5 shows a biparted mandrel.

In case an internal stop ring is to be provided in the sleeve, one will preferably use a biparted mandrel as shown in FIG. 5. The two halves 12 of the mandrel are axially displaced and stop ring 11 is positioned as shown. The wrapping process proceeds then as before. The stop ring may be made of the same or of another compatible plastic as the sleeve fitting.

The stop ring is shown with an outwardly bulging contour. If that mandrel is wrapped with axial precession, the pitch of the precession is increased upon reaching the bulge, and the resulting sleeve thickness is reduced accordingly in the axial region of the bulge. Beyond the bulge the normal (small) pitch at slow axial precession of the wrapping is resumed.

Figure 4:
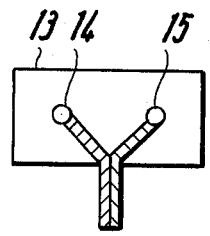
FIG. 4 shows a particular extrusion nozzle for making a two layer ribbon.

FIG. 4 illustrates by way of example how a plural layer ribbon can be made. The nozzle 13 shown is known per se. Two extruders feed two different materials to inputs 14 and 15 and a double layer ribbon 16 is extruded accordingly; that is the usual employment. For the invention, the two sources 14 and 15 are not used concurrently but sequentially with overlapping to obtain positive transition in the ribbon. The inner portion of the sleeve to be made results from wrapping ribbon of one kind of material, and subsequently, there is a changeover to the other kind.

The invention is not limited to the embodiments described above but all changes and modifications thereof not constituting departures from the spirit and scope of the invention are intended to be included.

I claim:

1. Method of interconnecting two thermoplastic tubes or pipes, comprising:
   providing a heating conductor coil in helical configuration and onto a mandrel, leaving spacing in-between the loops of the resulting helix;
   extruding a thermoplastic ribbon wider than the spacing between the loops to cover several, more than two loops at once;
   wrapping the ribbon as paid by the extrusion onto the coil as provided on the mandrel by causing the mandrel as carrying the coil to rotate at a speed faster than the speed of extrusion of the ribbon so that the ribbon is stretched as it is wrapped and in plural layers above as well as in-between the loops so as to obtain a coupler sleeve: inserting the tubes from opposite ends into the sleeve; and applying welding current to the coil thereby causing the ribbon material to soften and melt and the tensioned ribbon material fuses with the thermoplastic material of the tubes, the spacing between the loops of the coil permitting penetration of the ribbon material when softened upon heating of the sleeve by the coil.

2. Method as in claim 1, heating the rotating mandrel on which the coil is positioned, to obtain wrapping of the ribbon as paid by extrusion onto a heated mandrel.

3. Method as in claim 1, selecting the ribbon width, so that the stretched ribbon is still wider than the coil is long.

4. Method as in claim 1, providing plural coils in axial alignment and wrapping the ribbon helically onto all of them with axial precession to obtain overlap from ribbon loop to loop.

5. Method as in claim 1, urging the ribbon onto the mandrel during wrapping.

6. Method as in claim 1, using a ribbon of a first material for wrapping onto the coil, and a ribbon of a second material for wrapping onto the wrapping ribbon of the first material.

7. Method as in claim 1, wrapping a first ribbon of highly stabilized plastic onto the coil, and wrapping a high molecular plastic ribbon onto the first one.

8. Method as in claim 1, wrapping a first ribbon of plastic having low impact notch sensitivity onto the coil, and wrapping a high molecular plastic ribbon onto the first one.

9. Method as in claim 1, wrapping a first highly weldible ribbon onto the coil, the ribbon made of a copolymer of polyethylene, and wrapping a polyethylene ribbon of molecular weight above 90,000 onto the first ribbon.

10. Method as in claim 1, including the step of including strengthening elements in the wrapping.

11. Method as in claim 10, using rods of higher modulus of elasticity and smaller thermal expansion than the ribbon material.

12. Method as in claim 11, using rods of glass fiber reenforced epoxy resin.

13. Method as in claim 1, using a mandrel with holding means for the coil.

14. Method as in claim 13, using steel strips on the mandrel as holding means.

15. Method as in claim 14, the mandrel having a groove, using steel strips with angled ends for axial insertion in the groove.

16. Method as in claim 1, using a mandrel of two axially displaceable parts, to hold a stop ring to be included in the sleeve.

* * * * *